United States Patent
Ikeuchi et al.

(10) Patent No.: US 12,386,692 B2
(45) Date of Patent: Aug. 12, 2025

(54) FAULT RECOVERY SUPPORT APPARATUS, FAULT RECOVERY SUPPORT METHOD AND PROGRAM

(71) Applicant: NIPPON TELEGRAPH AND TELEPHONE CORPORATION, Tokyo (JP)

(72) Inventors: Hiroki Ikeuchi, Tokyo (JP); Yosuke Takahashi, Tokyo (JP); Kotaro Matsuda, Tokyo (JP); Tsuyoshi Toyono, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 7 days.

(21) Appl. No.: 18/252,223

(22) PCT Filed: Dec. 17, 2020

(86) PCT No.: PCT/JP2020/047094
§ 371 (c)(1),
(2) Date: May 9, 2023

(87) PCT Pub. No.: WO2022/130556
PCT Pub. Date: Jun. 23, 2022

(65) Prior Publication Data
US 2023/0409425 A1 Dec. 21, 2023

(51) Int. Cl.
G06F 11/00 (2006.01)
G06F 11/07 (2006.01)

(52) U.S. Cl.
CPC .................. *G06F 11/0793* (2013.01)

(58) Field of Classification Search
CPC ............ G06F 11/0793; G06F 11/0784; G06F 11/1048; G06F 11/1471
See application file for complete search history.

(56) References Cited

FOREIGN PATENT DOCUMENTS

CN 107025344 A * 8/2017 ............. G06F 30/20

OTHER PUBLICATIONS

H. Ikeuchi et al., "A framework for automatic failure recovery in ICT systems by deep reinforcement learning," in 2020 IEEE 40th International Conference on Distributed Computing Systems (ICDCS). IEEE, 2020.

(Continued)

*Primary Examiner* — Katherine Lin
(74) *Attorney, Agent, or Firm* — IPUSA, PLLC

(57) ABSTRACT

A fault recovery support apparatus according to an embodiment includes: a fault insertion unit configured to insert a fault into a target system; a behavior execution unit configured to execute a behavior related to recovery from the fault for the target system; a first construction unit configured to construct an automaton representing a recovery process from the fault by using observation data acquired from the target system as a result of the behavior by the behavior execution unit; and a second construction unit configured to construct a workflow representing a behavior for separating each fault included in a plurality of faults and a recovery process of each fault by using a plurality of the automatons related to the plurality of faults.

4 Claims, 13 Drawing Sheets

(56) References Cited

OTHER PUBLICATIONS

K. R. Joshi et al., "Probabilistic model-driven recovery in distributed systems," IEEE Transactions on Dependable and Secure Computing, vol. 8, No. 6, pp. 913-928, 2010.
A. Watanabe et al., "Workflow extraction for service operation using multiple unstructured trouble tickets," IEICE Transactions on Information and Systems, vol. 101, No. 4, pp. 1030-1041, 2018.
D. Angluin, "Learning regular sets from queries and counterexamples," Information and computation, vol. 75, No. 2, pp. 87 to 106, 1987.
M. Ester et al., "A density-based algorism for discovering clusters in large spatial databases with noise." in Kdd, vol. 96, No. 34, 1996, pp. 226-231.
L. McInnes et al., "Umap: Uniform manifold approximation and projection for dimension reduction," arXiv preprint arXiv:1802.03426, Sep. 18, 2020.

\* cited by examiner

Fig. 3A

| P \ S | ε | b |
|---|---|---|
| ε | 0 | 3 |
| a | 2 | 2 |
| b | 3 | 2 |
| aa | 1 | 1 |
| ab | 2 | 1 |
| abb | 1 | 1 |
| a | 2 | 2 |
| b | 3 | 2 |
| aa | 1 | 1 |
| ab | 2 | 1 |
| ba | 2 | 1 |
| bb | 2 | 1 |
| aaa | 1 | 1 |
| aab | 1 | 1 |
| aba | 1 | 1 |
| abb | 1 | 1 |
| abba | 1 | 1 |
| abbb | 1 | 1 |

Fig. 4

| | Algorithm 1 OLDFA construction |
|---|---|
| 1 | Initialize: |
| 2 | Observation table $T = \langle P \leftarrow \{\epsilon\}, S \leftarrow \{\epsilon\}, h \rangle$ |
| 3 | Observation data $Data = \{\}$ |
| 4 | EXPAND-TABLE($P, S, T$) |
| 5 | $learned \leftarrow False$ |
| 6 | while not $learned$ do |
| 7 | ### Checking the closedness and consistency ### |
| 8 | while $T$ is not closed or not consistent do |
| 9 | If $T$ is not closed, i.e., $\exists p^* \in P \cdot A$ s.t. $\hat{h}(p^*) \neq \hat{h}(p)$ |
| 10 | for $\forall p \in P$ then |
| 11 | $P \leftarrow P \cup \{p^*\}$ |
| 12 | EXPAND-TABLE($\{p^*\}, S, T$) |
| 13 | If $T$ is not consistent, i.e., $\exists p_1, p_2 \in P, a \in A,$ and $s \in S$ |
| 14 | s.t. $\hat{h}(p_1) = \hat{h}(p_2), h(p_1 \cdot a \cdot s) \neq h(p_2 \cdot a \cdot s)$ then |
| 15 | $S \leftarrow \{a \cdot s\} \cup S$ |
| 16 | EXPAND-TABLE($P, \{a \cdot s\}, T$) |
| 17 | ### Equivalence test ### |
| 18 | Create the consistent OLDFA $M(P, S, h)$ |
| 19 | $learned \leftarrow True$ |
| 20 | for $i = 1, 2, \cdots, N$ do |
| 21 | Sample $u \in A^*$ |
| 22 | If $\delta(q_0, u) \neq h(u)$ then |
| 23 | $U \leftarrow \{u\} \cup (u\text{'s prefixes})$ |
| 24 | $P \leftarrow P \cup U$ |
| 25 | EXPAND-TABLE($U, S, T$) |
| 26 | $learned \leftarrow False$ |
| 27 | break |
| 28 | Return $M(P, S, h)$ |

Fig. 5

| | Procedure 2 EXPAND-TABLE |
|---|---|
| 1 | Input: $(P', S', T)$ |
| 2 | for $p$ in $P'$ do |
| 3 |   for $s$ in $S'$ do |
| 4 |     Execute $p \cdot s$ on $X$ |
| 5 |     $Data(p \cdot s) \leftarrow O(p \cdot s)$ |
| 6 | Cluster observation data in $Data$ and attach labels $\tilde{h}(p, s)$ to |
| 7 | elements of $T$ |

Fig. 6

| | Algorithm 3 RPW construction |
|---|---|
| 1 | Input: $M^i = (Q^i, A, \delta^i, \{F_l^i\}_l, \{O_l^i\}_l)$ $(i = 1, \cdots, N)$ |
| 2 | Initialize: |
| 3 | Set $Edges \leftarrow \emptyset$ |
| 4 | Queue $nodeQueue \leftarrow [\langle l = 0, \Theta = (q_0^1, \cdots, q_0^N)\rangle]$ |
| 5 | Set $seen \leftarrow \{\langle l = 0, \Theta = (q_0^1, \cdots, q_0^N)\rangle\}$ |
| 6 | while $nodeQueue \neq \emptyset$ do |
| 7 | $\quad u = (l, \Theta) \leftarrow nodeQueue.get()$ |
| 8 | $\quad$ for $a \in A$ do |
| 9 | $\quad\quad \Theta_l = (N/A, \cdots N/A)$, $(l \in \cup_i L_i)$ |
| 10 | $\quad\quad$ for $i \in \{1, \cdots, N\}$ do |
| 11 | $\quad\quad\quad$ if $\Theta[i] \neq N/A$ then |
| 12 | $\quad\quad\quad\quad l \leftarrow label(\delta^i(\Theta[i], a))$ |
| 13 | $\quad\quad\quad\quad \Theta_l[i] \leftarrow \delta^i(\Theta[i], a)$ |
| 14 | $\quad\quad$ for $l \in \cup_i L_i$ do |
| 15 | $\quad\quad\quad v = (l, \Theta_l)$ |
| 16 | $\quad\quad\quad Edges.add((u, v, (a, l)))$ |
| 17 | $\quad\quad\quad$ if $v \notin seen$ then |
| 18 | $\quad\quad\quad\quad nodeQueue.put(v)$ |
| 19 | $\quad\quad\quad\quad seen.add(v)$ |
| 20 | Return $Edges$ |

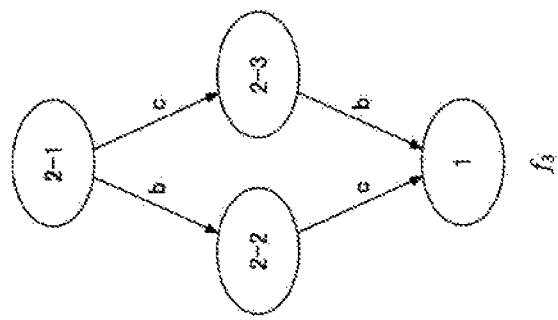
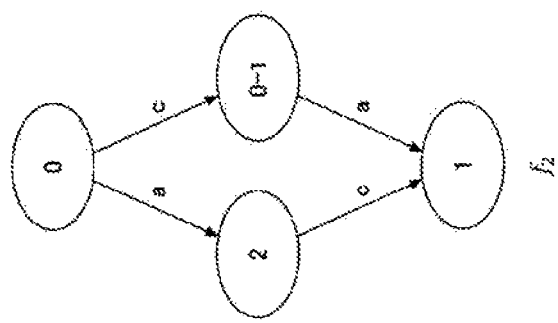
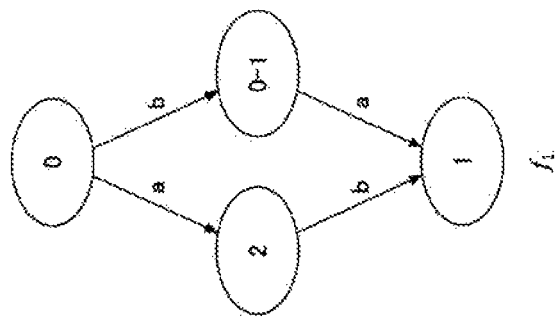
Fig. 10

FAULT RECOVERY SUPPORT APPARATUS, FAULT RECOVERY SUPPORT METHOD AND PROGRAM

TECHNICAL FIELD

The present invention relates to a fault recovery support apparatus, a fault recovery support method, and a program.

BACKGROUND ART

With increases in scale and complexity of information and communication technology (ICT) systems, the number and types of failures (faults) arising in the systems have increased. In order to perform handling such as recovery from failures, monitoring, analysis, and the like of observation data (for example, logs of systems, metrics, and the like) are necessary. However, an amount of data or relevancy between pieces of data becomes complicated and recovery tasks of failures become very difficult. Accordingly, in recent years, fault recovery operations using machine learning technology have been developed.

For example, NPL 1 discloses a scheme of executing a command for recovery of a system by trial and error and learning a recovery policy function of calculating a command to be executed subsequently by deep enhancement learning based on observation data obtained as feedback in a verification environment in which a failure is inserted. For example, NPL 2 discloses a scheme of calculating an optimum recovery method by formulating a fault recovery process in accordance with a probability model such as a Markov decision process (MDP) or a partially observable Markov version process (POMDP) and then using a scheme such as Bayesian estimation. Both of the schemes described in NPL 1 and NPL 2 can be said to be schemes aimed at automation of a fault recovery operation.

On the other hand, there is a technology for presenting to a maintenance person what behaviors to perform to recover a system. For example, NPL 3 discloses a technology for visualizing which behavior to perform next in a workflow format by a machine learning technology such as a hidden Markov model by using a trouble ticket from a time of failure handling in the past. It can be said that the technology described in NPL 3 is aimed at a reduction in generality of a fault recovery operation, standardization, and an improvement in efficiency by expressing a fault recovery process in a form easy for a maintenance person to understand.

CITATION LIST

Non Patent Literature

[NPL 1] H. Ikeuchi, J. Ge, Y. Matsuo, and K. Watanabe, "A framework for automatic fault recovery in ICT systems by deep reinforcement learning," in 2020 IEEE 40th International Conference on Distributed Computing Systems (ICDCS). IEEE, 2020 to be Published.
[NPL 2] K. R. Joshi, M. A. Hiltunen, W. H. Sanders, and R. D. Schlichting, "Probabilistic model-driven recovery in distributed systems," IEEE Transactions on Dependable and Secure Computing, vol. 8, no. 6, pp. 913-928, 2010.
[NPL 3] A. Watanabe, K. Ishibashi, T. Toyono, K. Watanabe, T. Kimura, Y. Matsuo and K. Shiomoto, and R. Kawahara, "Workflow extraction for service operation using multiple unstructured trouble tickets," IEICE Transactions on Information and Systems, vol. 101, No. 4, pp. 1030-1041, 2018.

SUMMARY OF INVENTION

Technical Problem

However, in the scheme disclosed in the foregoing NPL 1, since all learning and execution of a recovery policy function are automatically performed in a black box, a maintenance person cannot ascertain a state and a behavior of a system during a fault recovery. Therefore, for example, when an irregular event occurs during fault recovery and the maintenance person needs to take over and handle the event, it is difficult to handle the failure thereafter in some cases.

On the other hand, in the scheme disclosed in the foregoing NPL 2, since a fault recovery process is expressed with a probability model, a state and a behavior of a system can be ascertained to some degree. However, it is necessary for a maintenance person or the like to construct the probability model in advance. Therefore, in construction of the probability model, operation cost for the maintenance person is increased, and high-level knowledge about the system is also required. As the system increases in size and becomes complicated, the operation cost and knowledge required for constructing the probability model also increase.

According to the technology described in the foregoing NPL 3, a state, a behavior, and the like of a system can be read from a workflow because a fault recovery process is visualized as the workflow. However, a trouble ticket from a time of failure handling in the past is necessary in generation of the workflow. Therefore, for example, a workflow cannot be generated for a system in which an operation result is superficial or a failure of which an occurrence frequency is low in some cases.

An embodiment of the present invention has been contrived in view of the foregoing circumstances, and an objective of the embodiment is to support fault recovery in a target system.

Solution to Problem

In order to achieve the foregoing object, a fault recovery support apparatus according to an embodiment includes: a fault insertion unit configured to insert a fault into a target system; a behavior execution unit configured to execute a behavior related to recovery from the fault for the target system; a first construction unit configured to construct an automaton representing a recovery process from the fault by using observation data acquired from the target system as a result of the behavior by the behavior execution unit; and a second construction unit configured to construct a workflow representing a behavior for separating each fault included in a plurality of faults and a recovery process of each fault by using a plurality of the automatons related to the plurality of faults.

Advantageous Effects of Invention

It is possible to support fault recovery in a target system.

BRIEF DESCRIPTION OF DRAWINGS

FIG. 3A is a diagram illustrating an example of an observation table.

FIG. 4 is a diagram illustrating an example of an OLDFA construction algorithm.

FIG. 5 is a diagram illustrating an example of an EXPAND-TABLE procedure.

FIG. 6 is a diagram illustrating an example of an RPW construction algorithm.

FIG. 10 is a diagram illustrating a deterministic finite automaton with observation labels obtained in an experiment.

DESCRIPTION OF EMBODIMENTS

Figure 1A:
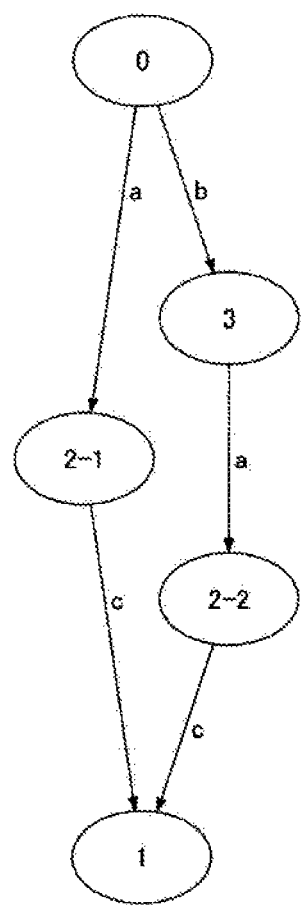
FIG. 1A is a diagram (part 1) illustrating an example of an observation-labeled deterministic finite automata.

Hereinafter, one embodiment of the present invention will be described. In the present embodiment, a failure recovery support device 10 (fault recovery support apparatus) capable of presenting a failure (fault) recovery process in a form that a maintenance person can understand without manually constructing a probability model or the like expressing the failure recovery process and without requiring presence of a trouble ticket or the like from handling of a past failure (fault) will be described.

<Theoretical Configuration>

Hereinafter, a theoretical configuration of the present embodiment will be described.

The present embodiment is broadly divided into two phases: (1) an observation-labeled deterministic finite automata (OLDFA) construction phase and (2) a recovery process workflow (RPW) construction phase. Therefore, problem definition and an input/output in each phase will be described first. Then, an algorithm for implementing each phase will be described. Here, the present embodiment is not limited to these problem settings, and can be applied to similar problem settings in which construction of an automaton is required.

OLDFA Construction Phase

In this phase, observation data is acquired by inserting a failure (fault) to be recovered from into a target system and then executing any behavior. An objective of the present invention is to construct an automaton for each failure by analyzing a combination of the behavior and observation data. The target system is, for example, a system that verifies a system which is an actual support target of failure recovery, an emulator simulating the system, or the like. The behavior is a behavior by which a state of the target system can be changed and is, for example, an input of any command.

In the present embodiment, it is assumed that a recovery process for the target system is sparse, discrete, and deterministic, and an automaton expressing a behavior of the target system is constructed by using these properties. The fact that the recovery process of the target system is sparse means that only a small number of kinds of behaviors change the state of the target system. The fact that the recovery process is discrete means that the number of possible behaviors is finite and transition of the state of the target system can be discretely expressed. Further, the fact that the recovery process is deterministic means that a transition destination of the state is also determined when the state of the target system and a behavior to be performed are determined.

Here, a state referred to in the present embodiment abstractly represents the state of the target system, and the foregoing assumption of the discreteness and the like is convenient for developing a theory. Therefore, the foregoing assumption does not limit applications of the present embodiment, and the present embodiment can be applied to, for example, a target system that continuously changes.

Hereinafter, a formal problem setting will be described. First, it is assumed that the target system is X, and a behavior of the target system is written as X(f) when a failure f∈F (where F is all the sets desired to be used as a target system) is inserted into X. When X(f) is described with the OLDFA, constructing the OLDFA is an objective of this phase.

The OLDFA is a kind of finite deterministic automaton defined in the present embodiment and is expressed as a tuple $<Q, A, \delta, q_0, \{F_l\}_{l \in L}, \{O_l\}_{l \in L}>$. Here, Q is a set of states, A is a set of behaviors, $\delta: Q \times A \to Q$ is a state transition function, $q_0 \in Q$ is an initial state, and $F_l \subset Q$ is a set of states having a label $l \in L = \{0, 1, \ldots, |L|-1\}$. $O_l$ represents an n-dimensional real-value probability variable (here, n is a natural number arbitrarily determined in advance) corresponding to label 1 and indicates observation data.

A* is defined as a set of the whole behavior sequence, and $\varepsilon \in A^*$ is defined as a behavior sequence having a length of 0. At this time, a definition domain of $\delta$ is expanded to $Q \times A^*$ as follows.

$$\delta(q, \varepsilon) = q$$

$$\delta(q, u \cdot a) = \delta(\delta(q, u), a)$$

Here, "·" which is $q \in Q$, $a \in A$, and $u \in A^*$ represents a combination of a behavior and behavior sequences.

Each $q \in Q$ belongs to exactly any one in $\{F_l\}_{l \in L}$. That is, Q is covered by $\{F_l\}_{l \in L}$ and a different $F_l$ does not have a common portion.

An initial state $q_0 \in F_0$ is a state of the target system immediately after insertion of the failure f and has label 0. It is assumed that a state that has label 1 is a state in which recovery is completed (that is, a normal state). In the present embodiment, for simplicity, it is assumed that $|F_1|=1$ (that is, there is only a normal state) and a mechanism determining whether the state is normal is separately provided.

A state that has label $l \in L$ outputs observation data according to the probability variable $O_l$. At this time, it should be noted that observation data is output according to the same probability distribution (probability variable) when the labels are the same even in different states. That is, this is also handled in the target system in which a state cannot be uniquely identified even when only the observation data is viewed, and the Markov property cannot be established even when only the observation data is viewed.

The OLDFA defined above is assumed to be behind X(f), and Q, $\delta$, and $\{F_l\}_{l \in L}$ cannot be directly observed. Instead, by executing a behavior sequence $u = a_1 a_2 \ldots a_{|u|} \in A^*$, the observation data in a state of a transition destination $$O(u) \equiv O_{\{label(\delta(q_0, u))\}} \quad \text{[Math. 1]}$$

an implemented value of [Math. 1] can acquired. Here, label (q) indicates a state q.

Figure 1B:
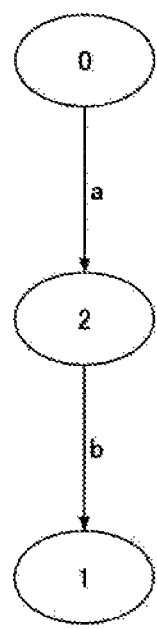
FIG. 1B is a diagram (part 2) illustrating an example of an observation-labeled deterministic finite automata.

At this time, in this step, an OLDFA for the failure f is constructed by executing the behavior sequence in an appropriate order after insertion of each failure f into the target system and analyzing the observation data obtained at that time. FIGS. 1A and 1B illustrate examples of the OLDFA.

The example illustrated in FIG. 1A is an OLDFA of a certain failure $f_1$, Q={0, 1, 2-1, 2-2, 3}, A={a, b, c}, L={0, 1, 2, 3}, $F_0$={0}, $F_1$={1}, $F_2$={2-1, 2-2}, and $F_3$={3}. At this time, the state is represented by a vertex on which the label is described, and δ is represented as a directed side to which the behavior is assigned. In FIG. 1A, for the sake of simplicity, a self-loop (a directed side from the self-loop vertex to the self-loop) is omitted. For example, when a behavior c is taken at the vertex of state 0, a self-loop, that is, δ(0, c)=0, is obtained. Similarly, for example, when the behavior c is taken at the vertex of state 3, a self-loop, that is, δ(0, bc)=3, is obtained. The same applies to other vertexes.

In the OLDFA illustrated in FIG. 1A, states 2-1 and 2-2 have the same label 2 and output observation data in accordance with the probability variable $O_2$. For identification, "2-1" and "2-2" are given.

In the OLDFA illustrated in FIG. 1A, for example, behavior sequences abac, bac, and the like are behavior sequences with which a failure can be recovered. That is, δ(0, abac)=δ(0, bac)=1. It should be noted that δ(2-1, a)=δ(2-1, b)=2-1 since there is a self-loop.

On the other hand, in the OLDFA illustrated in FIG. 1A, for example, since the behavior sequence bab or the like is δ(0, bab)=2-2, the behavior sequence is a behavior sequence with which a failure cannot be recovered.

FIG. 1B illustrates an OLDFA of another certain failure $f_2$ which can be considered to be similar to the OLDFA illustrated in FIG. 1A.

RPW Construction Phase

Referring to the OLDFA basically obtained in the OLDFA construction phase, a maintenance person can grasp the recovery process of the relevant failure. For example, when initial states of the failure $f_1$ and the failure $f_2$ are similar to each other and cannot be distinguished from each other (that is, when an initial state q1 of the failure $f_1$ and an initial state $q_2$ of the failure $f_2$ are outputted with the same probability distribution), it is not known which OLDFA for a failure should be referred to when one of the failures actually occurs. In order to avoid such a situation, a plurality of OLDFAs having similar initial states are merged as one workflow in this phase. In the present embodiment, this workflow is referred to as a recovery process workflow (RPW).

The RPW is defined as follows in terms of form. First of all, N OLDFs corresponding to the failure $f_i$ (where i=1, 2, . . . , N), that is, $$\text{OLDFA} M^i = <Q^i, A, \delta^i, \{F_l^i\}_{l \in L^i}, \{O_l^i\}_{l \in L^i}>$$ [Math. 2]

is assumed to be set. Here, N is the number of failures.

The RPW is expressed as a directed graph in which a label and a candidate for a state which can be present with respect to each failure are described in a node (vertex), and a behavior and a label of observation data obtained as a result of the behavior are described in a directed side.

That is, the vertex of the RPW is presented as tuple <l, Θ>. Here, $$l \in \cup_{i=1}^{N} L^i$$ [Math 3]

is a label, and Θ=($θ^1$, . . . , $θ^N$) ($Q^1 \cup$ {N/A})× . . . ×($Q^N \cup$ {N/A}) is indicates a state which can be present for each failure $f_i$. $θ^i$=N/A indicates that the failure $f_i$ cannot be obtained. $θ^1$, . . . and $θ^N$ all have label l as long as they are not N/A.

When the directed side from the vertex u=<$l_u$, $(θ_u^i)_{i \in \{1, \ldots, N\}}$> to the vertex v=<$l_v$, $(θ_v^i)_{i \in \{1, \ldots, N\}}$> of the RPW is written as $$(a \in A, l_v \in \cup_{i=1}^{N} L^i)$$ [Math. 4]

the directed side is present when and only when, $δ^i(θ_u^i, a)=θ_v^i$ is established for i satisfying $θ_u^i \neq$N/A and $θ_v^i$=N/A is established for i satisfying $θ_u^i$=N/A. $(θ^i)_{i \in \{1, \ldots, N\}}$=($θ^1$, . . . , $θ^N$) is set.

Figure 2:
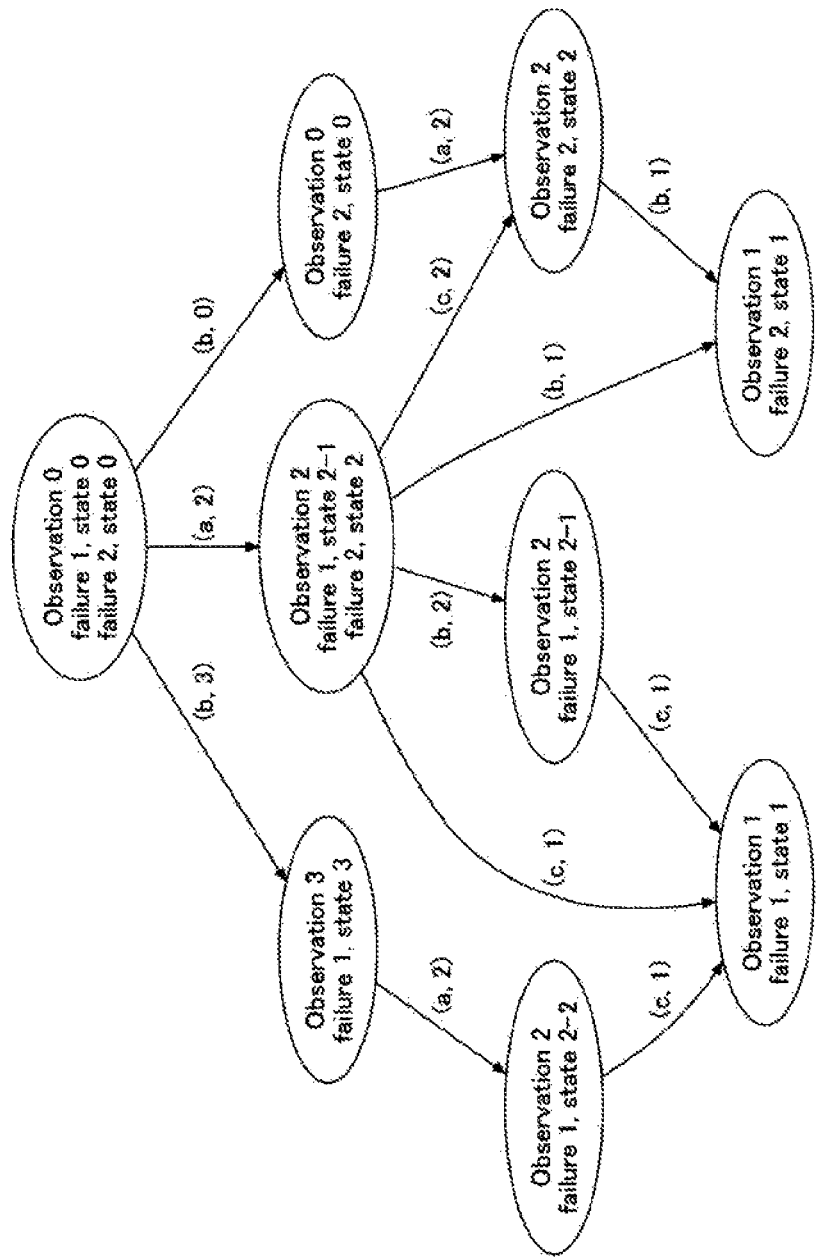
FIG. 2 is a diagram illustrating an example of a recovery process workflow.

An example of the RPW is illustrated in FIG. 2. The RPW illustrated in FIG. 2 is generated by merging the OLDFA of the failure $f_1$ illustrated in FIG. 1A and the OLDFA of the failure $f_2$ illustrated in FIG. 1B. In FIG. 2, Observation indicates a label, (failure1, state) indicates a state of the failure $f_1$, and (failure2, state) indicates a state of the failure $f_2$. A state in which N/A is taken is omitted. In FIG. 2, for simplicity, the self-loop is omitted (illustration of the drawing is omitted, and a directed side (not illustrated) is present as a self-loop).

For example, the topmost vertex in FIG. 2 is l=0 and Θ=($θ^1$, $θ^2$)=(0, 0). At this time, when it is assumed that the behavior b is executed to obtain observation data of the label l=3, transition to a vertex of l=3 and Θ=($θ^1$, $θ^2$)=(3, N/A) is executed. This means that failure candidates can be separated well and narrowing of the failure $f_1$ can be executed. When further transition to (behavior, label of observation data)=(a, 2), (c, 1) is executed, it can be understood that the failure $f_1$ can be recovered.

On the other hand, for example, when it is assumed that a behavior a is executed at the topmost vertex in FIG. 2 and the observation data of the label l=2 is obtained, transition to a vertex of l=3 and Θ=(2-1, 2) is executed. Accordingly, at this time, the failure has not yet been separated. For example, when further transition to (behavior, label of observation data)=(b, 2) is executed, narrowing of the failure $f_1$ can be executed. When transition to (c, 1) is executed, the failure $f_1$ can be recovered.

Observation Table

Before algorithms for the foregoing OLDFA construction phase and RPW construction phase are described, an observation table which is one of the important concepts in the present embodiment will be described. The algorithm of the OLDFA construction phase according to the present embodiment is similar to the algorithm called the L* algorithm. The L* algorithm is an algorithm that obtains a deterministic finite automata (DFA) by expanding the observation table based on a result of a binary observation value (0: unaccepted, 1: accepted) obtained by executing a behavior systematically. The details of the L* algorithm should be referred to, for example, reference literature 1 "D. Angluin, "Learning regular sets from queries and counterexamples," Information and computation, vol. 75, No. 2, pp. 87 to 106, 1987." or the like.

Hereinafter, an expanded observation table of the L* algorithm will be described as in the construction of the OLDFA. When A and L are given, the observation table is expressed as tuple T=<P, S, h>. Here, P∪A* is a prefix-closed set, S∪A* is a suffix-closed set, and h:(P∪P·A) S→L is a function.

A set E∪A* is referred to as a prefix-closed when or only when u∈E is satisfied at the time of u·a∈E for u∈A* and a∈A. The E ⊂ A* is referred to as a suffix-closed when or only when u∈E is satisfied at the time of a·u∈E for u∈A* and a∈A.

The observation table is a 2-dimensional matrix in which elements of P∪P·A are indexes of rows and elements of S are indexes of columns. Each element can be expressed as a 2-dimensional matrix defined as $$\tilde{h}:(P\cup P\cdot A)\times S \mapsto (p,s) \to h(p\cdot s) \in L \qquad [\text{Math. 5}]$$

In text of the present specification, the foregoing number 5 is written as "~h" below.

Further, as a row vector, $$\tilde{h}:(P\cup P\cdot A) \to L^{|S|} \qquad [\text{Math. 6}]$$

is defined as $$\tilde{h}(p)=(\tilde{h}(p,s_1),\tilde{h}(p,s_2),\ldots,\tilde{h}(p,s_{|S|})) \qquad [\text{Math. 7}]$$

Here, $p \in (P \cup P \cdot A)$ and $s_j \in S$ (where $j=1, \ldots, |S|$) are satisfied. In text of the present specification, the foregoing number 6 is written as "vector ~h" below.

At this time, an observation table formed with a vector ~h (hereinafter written as an "observation table ~h") is closed when "there is certain $p \in P$ for "any $p' \in P \cdot A$ and a vector ~h(p')=vector ~h(p)" are established. When "a vector ~h($p_1$)=vector ~h($p_2$) is satisfied for any $p_1, p_2 \in P$, $a \in A$ and a vector ~h($p_1 \cdot a$)=vector ~h($p_2 \cdot a$)" is established, the observation table is consistent.

For a closed and consistent observation table ~h, the OLDFA in which the number of vertexes satisfying $\delta(q_0, p \cdot s)$=~h(p, s) is the minimum can be constructed as follows.

$$Q=\{\tilde{h}(p) | p \in P\}$$

$$q_0=\tilde{h}(\in)$$

$$\delta(\tilde{h}(p),a)=\tilde{h}(p \cdot a)$$

$$F_c=\{\tilde{h}(p) | p \in P, h(p)=l\} \qquad [\text{Math. 8}]$$

Figure 3B:
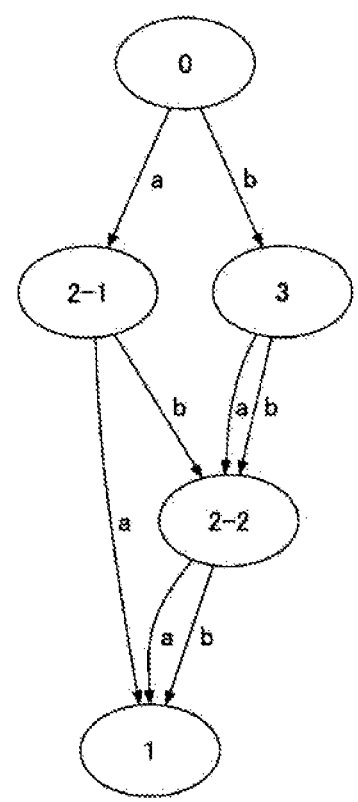
FIG. 3B is a diagram illustrating an example of an observation-labeled deterministic finite automata corresponding to the observation table.

An example of the observation table is illustrated in FIG. 3A. FIG. 3B illustrates an example of OLDFA corresponding to the observation table (that is, the OLDFA constructed from the observation table).

The upper six rows (from $\varepsilon \in P$ to abb$\in P$) of the observation table illustrated in FIG. 3A are vectors ~h(p) for $p \in P$ and the lower twelve rows are vectors ~h(p) for $p \in P \cdot A$. Accordingly, the observation table formed by vectors ~h(p) for $p \in P \cup P \cdot A$ in the eighteen rows is expressed.

The vector ~h($\in$) corresponds to state 0 of the OLDFA illustrated in FIG. 3B. Similarly, a vector ~h(a) corresponds to state 2-1, a vector ~h(b) corresponds to state 3, vector ~h(aa) corresponds to state 1, and vector ~h(ab) corresponds to state 2-2. It can be understood that state 2-1 and state 2-2 have the same label 2 but are distinguished with transition caused by the behavior b.

OLDFA Construction Algorithm

Next, an algorithm for implementing the OLDFA construction phase (an OLDFA construction algorithm) will be described. An example of the OLDFA construction algorithm is illustrated in FIG. 4.

As illustrated in FIG. 4, the OLDFA construction algorithm is similar to the L' algorithm except for an EXPAND-TABLE procedure inserted meanwhile. That is, after an observation table T, a data area Data in which observation data is stored, and an EXPAND-TABLE procedure are initialized (first to fourth rows), False is set in learned (5th row). Then, while learned is False, processing after the seventh and subsequent rows is repeated (6th row). Here, learned is a flag indicating whether an OLDFA equivalent to an actual recovery process of the target system is constructed.

When closedness and consistency of the observation table T are tested in the 8th to 16th rows and closedness is broken, addition of a row to the observation table T is executed (9th to 12th rows). When consistency is broken, addition of a column to the observation table T is executed (13th to 16th rows). The addition of the row and the addition of the column are executed in an EXPAND-TABLE procedure to be described below.

When the observation table T is closedness and consistency, an OLDFA is constructed from the observation table T (18th row) and a True is set to the learned, (19th row), and then an equivalence test is executed (20th to 27th rows). The equivalence test is a test for confirming whether the target system conforms to the OLDFA.

In the equivalence test, sampling of an appropriate behavior sequence is executed (the 21st row), the target system is executed in the behavior sequence, the state of the OLDFA is caused to transition, and it is determined whether the observation data obtained by the target system matches a label obtained by the OLDFA (22nd row). In the OLDFA construction algorithm illustrated in FIG. 4, the equivalence test is executed for i=1, 2, . . . , N (where N is a predetermined integer equal to or greater than 1). The index i is an index indicating the number of repetition of the equivalence test and is different from the index i of the failure $f_i$.

When it is determined that observation data obtained by the target system matches the label obtained by the OLDFA in all the sampled behavior sequences, the OLDFA is output (28th row). Conversely, when there is an unmatched behavior sequence, expansion of the observation table T is executed as a counter-example (23rd to 25th rows) of the behavior sequences, False is then set in learned (26th row), and omission from the equivalence test is executed (27th row). Thus, the closedness and the consistency are tested again.

(EXPAND-TABLE Procedure)

Next, an EXPAND-TABLE procedure will be described. An example of an algorithm of the EXPAND-TABLE procedure is illustrated in FIG. 5. This EXPAND-TABLE procedure is the most fundamental difference between the L* algorithm handling binary observation values of 0 and 1 and the technology according to the present embodiment handling observation data which is a multidimensional probability value. In this procedure, when a behavior sequence set P' which is an index set of the rows, a behavior sequence set S' which is an index set of the columns, and a current observation table T are given, processing for adding each of elements of P' and elements of S' as a row and a column to T is executed.

Specifically, in the 2nd to 5th rows, p·s is executed for all the sets of $p \in P'$ and $s \in S'$ in the target system (4th row) to acquire observation data. Then, the observation data is all stored in a data area Data (p·s) (5th row). It is assumed that, in the data area Data, observation data at the time of execution of the EXPAND-TABLE procedure before the present time is not erased and remains. The data area Data is realized by, for example, a database or the like.

Thereafter, unsupervised clustering is executed using all the observation data accumulated in the data area Data and a cluster number obtained as a result is used as a label to be given to ~h(p·s)=h(p·s) (6th and 7th rows). That is, a label given to h(p·s) is registered as an element having p as a row index and has s as a column index. Thus, the observation table T is expanded.

The foregoing clustering processing can be said to be processing for converting the observation data which is a multidimensional probability value into a label which is a finite discrete value. Thus, it is possible to handle the observation table in the same manner as the L* algorithm. The main reasons why the observation data is all accumulated in the data area Data and the clustering is executed are that clustering reliability is higher as the number of pieces of data is larger, and a clustering result is meaningful for only the classification method and is not meaningful for a number itself allocated to each cluster, and therefore it is simply to execute the clustering on all the observation data again and exchange all the values of the elements of the observation table.

Several variations of the clustering such as variations exemplified in the following (a) and (b) are considered, and the present invention is not necessarily limited to those described above.
  (a) When a sufficient number of pieces of observation data has already been accumulated, a supervised classifier associating the observation data with labels may be learned, and the labeling may be executed by the classifier subsequently.
  (b) When a sufficient number of pieces of observation data has already been accumulated, only additional observation data may be clustered by online clustering or the like subsequently.

Any clustering scheme can be used and a scheme that has the following Properties 1 and 2 is preferable. As the clustering scheme that has the Properties 1 and 2, for example, DBSCAN or the like can be exemplified. For DBSCAN, for example, reference literature 2 "M. Ester, H-P. Kriegel, J. Sander, X. Xu et al., "A density-based algorism for discovering clusters in large spatial databases with noise." in Kdd, vol. 96, No. 34, 1996, pp. 226-231." and the like.

Property 1: The number of clusters can also be estimated at the same time. This is because information regarding the number of states and the number of labels is not held in advance.

Property 2: No specific assumption such as Gaussian distribution is imposed on distribution of the observation data. This is because data characteristics of the observation data are not always held.

RPW Construction Algorithm

Next, an algorithm for implementing the RPW construction phase and the RPW construction algorithm will be described. An example of the RPW construction algorithm is illustrated in FIG. 6.

Although the RPW construction algorithm integrates (merges) a plurality of OLDFAs, it is necessary to unify all the meanings of the label numbers in the OLDFAs before the merging. For example, it is necessary to allocate label 2 in the OLDFA of the failure $f_1$ and label 2 in the OLDFA of the failure $f_2$ to the probability variable of the same observation data. Accordingly, before this algorithm is executed, for example, it is necessary to execute clustering processing collectively again to unify the label values of the OLDFAs or to unify the label values of the respective OLDFAs by using the same classifier. Alternatively, for example, when the OLDFA is constructed, the OLDFA is not individually constructed for each failure. When a plurality of initial states are prepared for each failure to construct one OLDFA in accordance with the OLDFA construction algorithm and the maximum component that can reach from each initial state is subsequently extracted, the OLDFA for each failure in which a label number is spontaneously unified can be acquired.

As illustrated in FIG. 6, the RPW construction algorithm is supplied with N OLDFA $M_i$ (where i=1 ..., N). This i is the same as the index i of a failure $f_i$.

The RPW construction algorithm constructs the RPW by defining vertices and directed sides while confirming where a subsequent state transitions for each state and behavior in the OLDFA for each failure. As an order in which the vertices and the oriented sides are constructed, for example, as illustrated in FIG. 6, a width may be constructed preferentially for a vertex u=<l, Θ>.

Specifically, after a set Edges, a queue nodeQueue, and a set seen are initialized (2nd to 5th rows), a graph is constructed during nodeQueue≠φ (6th to 19th rows). On the other hand, when nodeQueue≠φ is satisfied, Edges is output (20th row). Edges is a set that has (u, v, (a, l)) as an element when a start point of a directed side is u, an end point of the directed side is v, and a behavior and a label described in the directed side is (a, l). Thus, an RPW in which the N OLDFAs are merged is constructed.

In the construction of the graph, a vertex getting from nodeQueue is set as u=<l, Θ> (7th row) and the 9th to 19th rows are repeated for each a∈A (8th row). Note getting is an operation of extracting an element from nodeQueue which is a list structure of first-in first-out.

When $\sim\Theta_1$=(N/A, ..., N/A) is set for all l∈$U_i L_i$ in the 9th row and Θ[i]≠N/A is set for i∈{1, ..., N} in the 10th to 13th rows, a label of $\delta^i(\Theta[i], a)$ is obtained and a state $\sim\Theta_1[i]$ corresponding to the label is updated to $\delta^i(\Theta[i], a)$. Here, Θ[i] represents an ith element of Θ.

In the 14th to 19th rows, v=<l, $\sim\Theta[i]$> is set for l∈$U_i L_i$, and then (u, v, (a, l)) is added to Edges. When v is not included in seen, v is added to nodeQueue and v is also added to seen. seen is a set which stores nodes already constructed as the RPW.

<Hardware Configuration>

Figure 7:
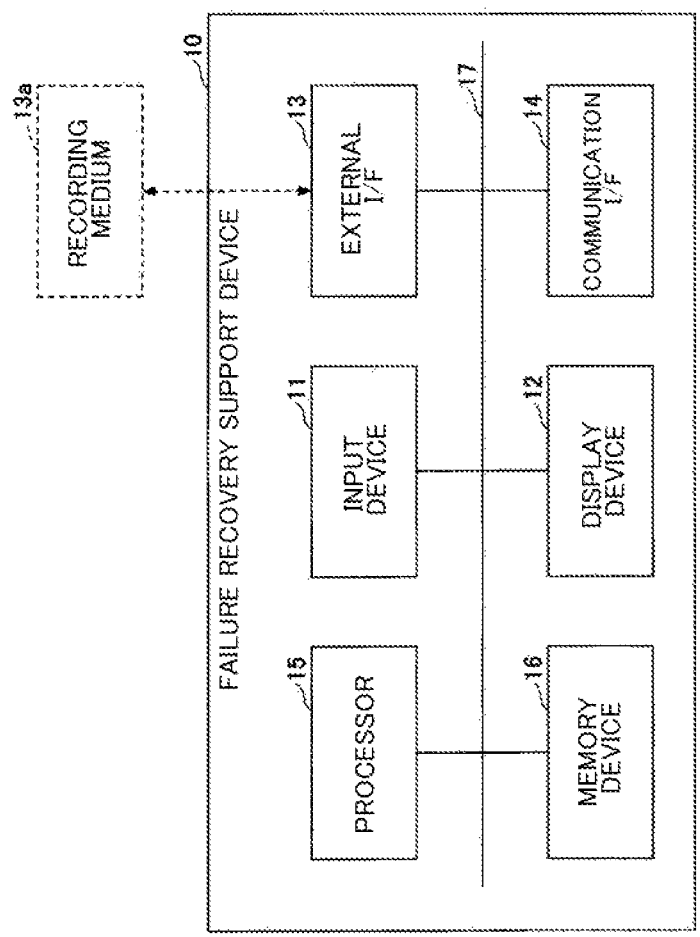
FIG. 7 illustrates an example of a hardware configuration of a failure recovery support device according to the present embodiment.

Next, a hardware configuration of the failure recovery support device 10 according to the present embodiment will be described with reference to FIG. 7. FIG. 7 is a diagram illustrating an example of a hardware configuration of the failure recovery support device 10 according to the embodiment.

As illustrated in FIG. 7, the failure recovery support device 10 according to the present embodiment is implemented by a hardware configuration of a general computer or computer system and includes an input device 11, a display device 12, an external I/F 13, a communication I/F 14, a processor 15, and a memory device 16. The hardware is connected via a bus 17 to be able to communicate with each other.

The input device 11 is, for example, a keyboard, a mouse, a touch panel, or the like. The display device 12 is, for example, a display or the like. The failure recovery support device 10 may not include at least one of the input device 11 and the display device 12.

The external I/F 13 is an interface with an external device such as a recording medium 13a. The failure recovery support device 10 can perform reading, writing, and the like of the recording medium 13a via the external I/F 13. Examples of the recording medium 13a include a compact disc (CD), a digital versatile disk (DVD), a secure digital (SD) memory card, and a Universal Serial Bus (USB) memory card.

The communication I/F 14 is an interface connecting the failure recovery support device 10 to a communication network. The processor 15 is any of various arithmetic devices such as a central processing unit (CPU) and a graphics processing unit (GPU). The memory device 16 is, for example, any of various storage devices such as a hard disk drive (HDD), a solid-state drive (SSD), a random access memory (RAM), a read only memory (ROM), and a flash memory.

The failure recovery support device 10 which has the hardware configuration illustrated in FIG. 7 according to the present embodiment can implement various kinds of processing to be described below. The hardware configuration illustrated in FIG. 7 is exemplary and the failure recovery support device 10 may have another hardware configuration. For example, the failure recovery support device 10 may include a plurality of processors 15 and may include a plurality of memory devices 16.

<Functional Configuration>

Figure 8:
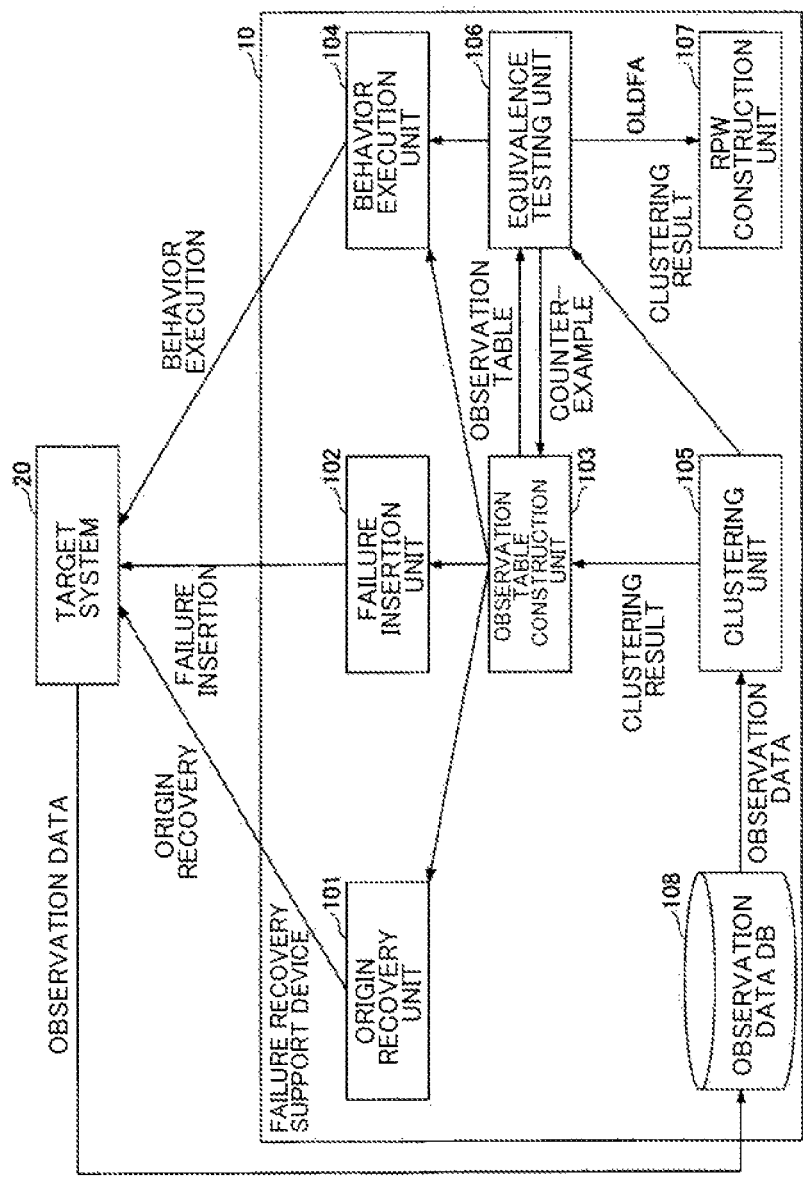
FIG. 8 is a diagram illustrating an example of a functional configuration of the failure recovery support device according to the present embodiment.

Next, a functional configuration of the failure recovery support device 10 according to the present embodiment will be described with reference to FIG. 8. FIG. 8 is a diagram illustrating an example of the functional configuration of the failure recovery support device 10 according to the present embodiment.

As illustrated in FIG. 8, the failure recovery support device 10 according to the present embodiment includes an origin recovery unit 101, a failure insertion unit 102, an observation table construction unit 103, a behavior execution unit 104, a clustering unit 105, an equivalence testing unit 106, and an RPW construction unit 107. Each of the units is implemented, for example, through processing that one or more programs installed in the failure recovery support device 10 cause the processor 15 to execute.

The failure recovery support device 10 according to the present embodiment includes an observation data DB 108. The observation data DB 108 can be implemented by, for example, the memory device 16 (in particular, a nonvolatile memory device such as an HDD or a flash memory). The observation data DB 108 may also be realized by using, for example, a storage device connected to the failure recovery support device 10 via the communication network or the like.

The origin recovery unit 101 performs origin recovery for returning the target system 20 to a normal state. Here, the target system 20 is a system that verifies a system which is an actual support target of a failure recovery, an emulator simulating the system, or the like, as described above. The origin recovery unit 101 is not necessarily provided in the failure recovery support device 10, and for example, the target system 20 may have the origin recovery unit 101.

The failure insertion unit 102 inserts a failure into the target system 20. The failure insertion unit 102 can be implemented by a tool (generally called a failure insertion tool or the like) that artificially inserts various kinds of failure data into the target system 20.

The observation table construction unit 103 performs expansion of the observation table, a closedness/consistency test or determines a subsequent behavior.

The behavior execution unit 104 executes a behavior determined by the observation table construction unit 103. The behavior execution unit 104 is implemented by program processing called an agent capable of executing various behaviors or the like.

The clustering unit 105 clusters the observation data accumulated in the observation data DB 108.

The equivalence testing unit 106 constructs an OLDFA from the observation table and performs an equivalence test.

The RPW construction unit 107 constructs an RPW from a plurality of OLDFAs.

The observation data DB 108 accumulates observation data acquired from the target system 20.

<Flow of Processing in OLDFA Construction Phase and RPW Construction Phase>

Figure 9:
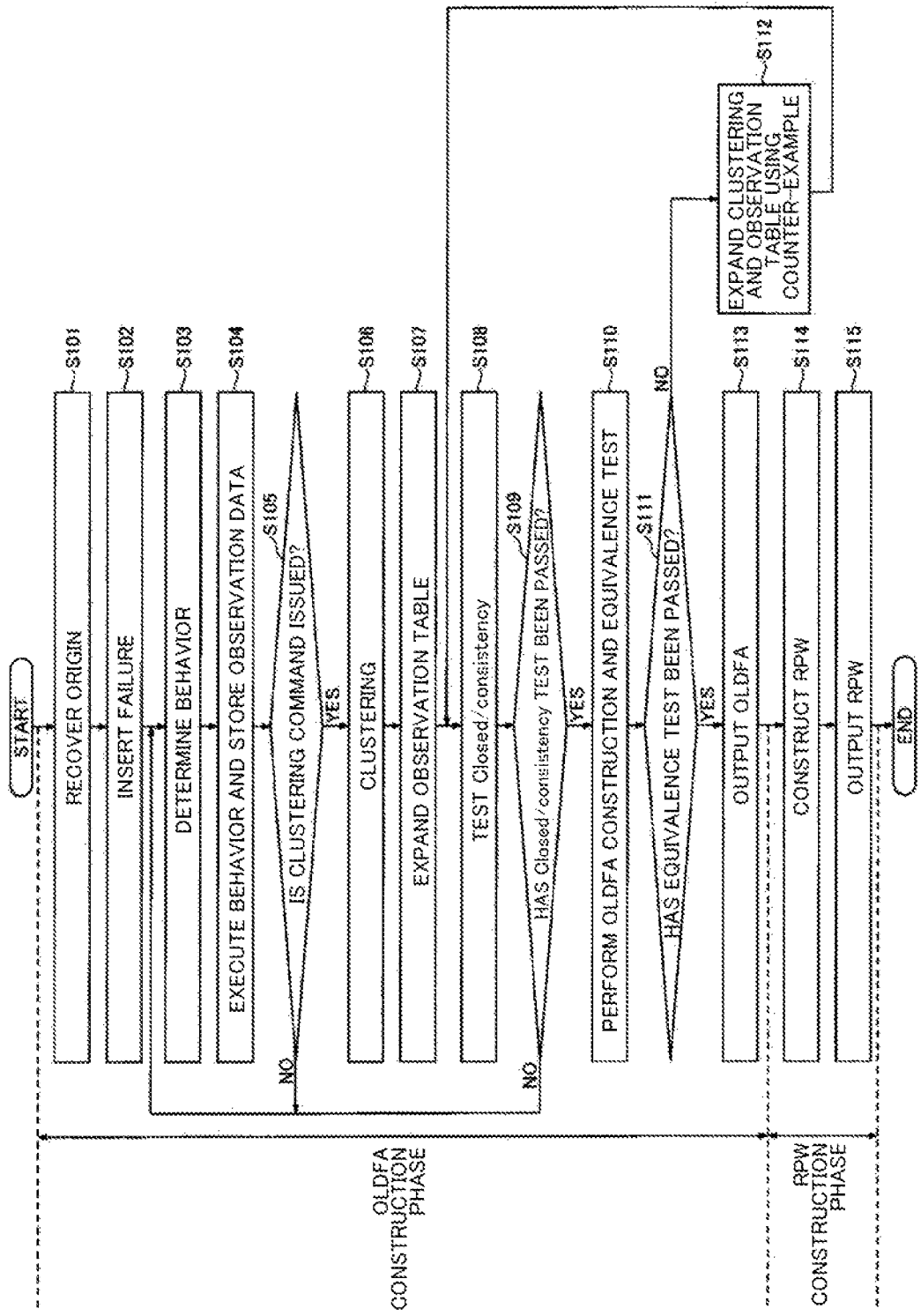
FIG. 9 is a flowchart illustrating an example of a flow of processing in an OLDFA construction phase and an RPW construction phase according to the present embodiment.

Next, a flow of processing in the OLDFA construction phase and the RPW construction phase will be described with reference to FIG. 9. FIG. 9 is a flowchart illustrating an example of a flow of processing in the OLDFA construction phase and the RPW construction phase according to the present embodiment. Steps S101 to 113 of FIG. 9 are processing of the OLDFA construction phase, and steps S114 and S115 of FIG. 9 are processing of the RPW construction phase.

Here, the processing (steps S101 to S113) of the OLDFA construction phase is repeatedly executed for each failure to construct the OLDFA for each failure. That is, steps S101 to S113 are repeatedly executed for each failure $f_i$ (where i=1, . . . , N). Hereinafter, a flow of processing when the OLDFA corresponding to a certain failure $f_i$ is constructed will be described below as an example. Although the case where the observation table is expanded after accumulation of a certain amount of observation data of FIG. 9 has been described, the observation table can be expanded from a state where no observation data is accumulated, as described in the OLDFA construction algorithm illustrated in FIG. 4.

However, when a plurality of initial states are prepared for each failure and one OLDFA is constructed by the OLDFA construction algorithm, it is not necessary to repeatedly execute steps S101 to S113. In this case, not only one failure but also various failures are inserted in step S102 to be described below.

First, the origin recovery unit 101 performs origin recovery for returning the target system 20 to a normal state (S101).

Next, the failure insertion unit 102 inserts the failure $f_i$ to the target system 20 (step S102).

Next, the observation table construction unit 103 determines the next behavior (step S103). The observation table construction unit 103 determines the p·s of the fourth row of the EXPAND-Table procedure illustrated in FIG. 5 as a subsequent behavior.

Next, the behavior execution unit 104 executes the behavior determined in the foregoing step S103 (step S104). Thus, the observation data is acquired from the target system 20, and the observation data are accumulated in the observation data DB 108.

Next, the clustering unit 105 determines whether a clustering command is issued from the observation table construction unit 103 (step S105). When the clustering command is not issued, the processing returns to step S103. When the clustering command is issued, the processing proceeds to step S106. The observation table construction unit 103 may issue a clustering command, for example, when a fixed number or more of pieces of observation data are accumulated in the observation data DB 108. When the clustering command is issued once, the determination of the present step may not be performed subsequently.

The clustering unit 105 clusters the observation data accumulated in the observation data DB 108 (step S106). Then, the observation table construction unit 103 expands the observation table by using the clustering result of the foregoing step S106 (step S107). Steps S106 and S107 correspond to the sixth and seventh rows of the EXPAND-TABLE procedure illustrated in FIG. 5.

Next, the observation table construction unit 103 executes a closedness/consistency test (that is, a test of whether the determination of the 7th row and the determination of the 13th and 14th rows of the OLDFA construction algorithm illustrated in FIG. 4 are satisfied) (step S108). Next, the observation table construction unit 103 determines whether the closedness/consistency test has passed (S109).

When it is determined that either the closedness or the consistency is not satisfied, the processing returns to step S103. Thus, when it is determined that the closedness is not satisfied, a behavior of p* in the ninth and tenth row of the OLDFA construction algorithm illustrated in FIG. 4 is determined as a subsequent behavior in the step S103. Conversely, when it is determined that the consistency is not satisfied, a in the thirteen and fourteen rows of the OLDFA construction algorithm illustrated in FIG. 4 is determined as a subsequent behavior in the step S103. Thereafter, the observation table construction unit 103 executes the eleventh and twelfth rows or the fifteenth and sixteenth rows of the OLDFA construction algorithm illustrated in FIG. 4. Thereafter, in the step S104, the behavior execution unit 104 executes a subsequent behavior and observation data are acquired and accumulated in the observation data DB 108 (the second to fourth rows of the EXPAND-TABLE procedure illustrated in FIG. 5), and the clustering unit 105 clusters the observation data in the foregoing step S106 and the observation table construction unit 103 expands the observation table in the foregoing step S107 (the sixth and seventh rows of the EXPAND-TABLE procedure illustrated in FIG. 5). Thereafter, the closedness/consistency test is executed again in the foregoing step S108.

On the other hand, when it is determined that the closedness and the consistency are satisfied, the process proceeds to a step S110. An equivalence testing unit 106 constructs an OLDFA from the observation table, and then performs the equivalence test (step S110). That is, the equivalence testing unit 106 executes the 18th and 22th rows of the OLDFA construction algorithm illustrated in FIG. 4.

Next, the equivalence testing unit 106 determines whether the OLDFA has passed through the equivalence test or not (step S111). The equivalence testing unit 106, for example, may determine that the equivalence test has passed when labels match in all behavior sequences U sampled in the 21st row of the OLDFA construction algorithm illustrated in FIG. 4, or may determine that the equivalence test has passed when labels match in a certain number of behavior sequences U.

When it is determined that the equivalence test is not passed in the step S111, an observation table construction unit 103 executes the 23rd and 27th rows of the OLDFA construction algorithm illustrated in FIG. 4 (step S112). As a result, the EXPAND-TABLE procedure illustrated in FIG. 5 is called, and clustering and extension of the observation table are performed by using the counter-example. Then, in the step S108, a closedness/consistency is executed again.

Conversely, when it is determined in step S111 that the equivalence test has passed, the equivalence testing unit 106 outputs the OLDFA on which the equivalence test has passed (step S113).

Subsequently, in the RPW construction phase, the RPW construction unit 107 inputs any plurality of OLDFAs and constructs RPW from the OLDFAs in accordance with the RPW construction algorithm illustrated in FIG. 6 (step S114).

Then, the RPW construction unit 107 outputs the RPW constructed in the foregoing step S114 (step S115).

As described above, the failure recovery support device 10 according to the present embodiment can construct an automation (OLDFA) indicating a state and a behavior of the target system in the recovery process by artificially inserting various failures into the target system 20 and acquiring observation data while taking various behaviors by the agent. Further, the failure recovery support device 10 according to the present embodiment constructs a recovery process workflow in which the plurality of OLDFAs are integrated (merged). Thus, for example, even when a type of failure cannot be identified, transition to the state and behavior of the target system can be ascertained.

As described above, since the failure recovery support device 10 according to the present embodiment automatically executes all the processes, it is not necessary to design a probability model by a manual operation. Since a failure is inserted artificially, it is possible to construct an automaton and a workflow even for a low frequent failure or an unknown failure. In this case, presence of a trouble ticket at the time of handling of a past failure is not assumed either.

Then, a maintenance person can easily ascertain a state and a behavior of the target system by referring to the OLDFA and the RPW. Thus, the failure recovery operation in an actual target system can be accelerated and standardized.

The OLDFA and the RPW can be utilized not only when the maintenance person himself or herself manually recovers a failure, for example, but also when an agent implemented by an artificial intelligence (AI) technology or the like-automatically recover a failure, and the maintenance person can confirm a recovery process by the agent.

<Experiment Result>

Hereinafter, a result obtained by carrying out an actual experiment using the failure recovery support device 10 according to the present embodiment will be described.

In this experiment, a Kubernetes cluster was generated using Kubernetes which is an orchestrator of a container type virtual environment, and a web3 layer environment was constructed therein. The web3 layer environment implemented by the container is regarded as the target system 20 in the present embodiment. The web3 layer environment is configured from three containers of Nginx, Rails, and MySQL.

At this time, http requests were generated at random by a load test tool as background traffic. As a failure, a delay of 2,000±100 ms was inserted into two containers among the three containers.

Inflow and outflow traffic in each container (on a byte basis or a number-of-packet basis) were collected in each container to be set as observation data. The observation data is a 12-dimensional vector. After normalization, the dimensions were reduced by UMAP and clustering was performed by DBSCAN. For the UMAP, refer to, for example, reference literature 3 "L. McInnes, J. Healy, and J. Melville, "Umap: Uniform manifold approximation and projection for dimension reduction," arXiv preprint arXiv:1802.03426, 2018."

A behavior that the agent can take is execution of a command for regenerating each container. Since there are three containers in total, the total number of behaviors is three. More specifically, a: Nginx was regenerated, b: Rails was regenerated, and c; MySQL was regenerated. The container into which a failure is inserted is recovered by issuing a regeneration command.

An OLDFA constructed by the failure recovery support device 10 according to the present embodiment under the above-described experimental setting is illustrated in FIG. 10. $f_1$ is a delay of Nginx and Rails, $f_2$ is a delay of Nginx and MySQL, and $f_3$ is a delay of Rails and MySQL. Since the labels are unified for the three OLDFAs, the OLDFA of $f_3$ does not have label 0 in an initial state. These OLDFAs completely match the expected results. For example, $f_2$ is recovered when the behaviors a and c are executed. However, a process is indicated as OLDFA.

Figure 11:
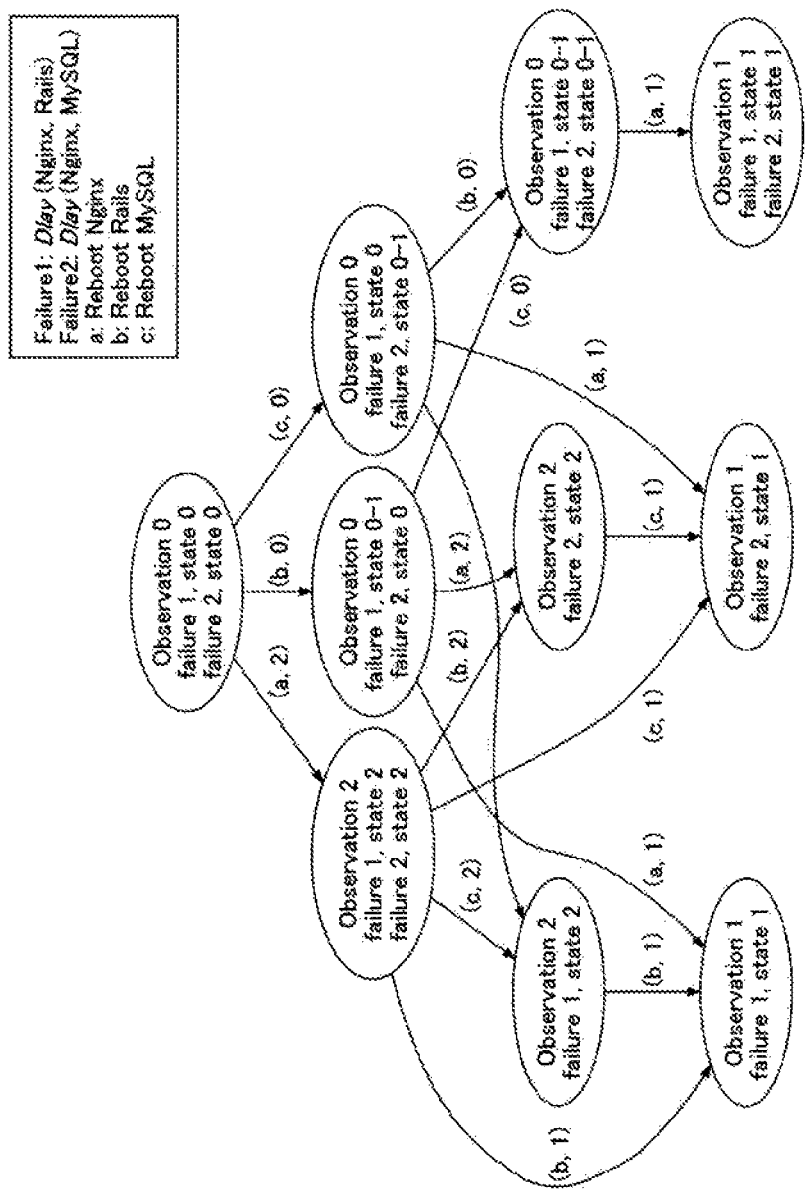
FIG. 11 is a diagram illustrating a recovery process workflow obtained in an experiment.

In $f_1$ and $f_2$, labels in the initial states are both 0, and a failure cannot be separated with only the observation data. Therefore, the RPWs were constructed. The results are illustrated in FIG. 11. The RPWs also completely coincide with the expected results. For example, as a path in which $f_2$ is recovered, {(a, 2), (c, 1)}, {(b, 0), (a, 2), (c, 1)}, and the like are indicated. Referring to the RPWs, the maintenance person can ascertain a behavior which will be taken to separate a failure and recovery is achieved even when the maintenance person does not know whether the failure is $f_1$ or $f_2$ at first. Alternatively, even when an AI agent such as another technology or reinforcement learning tries automatic recovery, the state and behavior of the target system 20 can be understood as a flow by referring to the RPW.

The present invention is not limited to the foregoing specifically disclosed embodiment, and various modifications and changes, combinations with known technologies, and the like can be made without departing from the description of the claims.

REFERENCE SIGNS LIST

10 Failure recovery support device
11 Input device
12 Display device
13 External I/F
13a Recording medium
14 Communication I/F
15 Processor
16 Memory device
17 Bus
101 Origin recovery unit
102 Failure insertion unit
103 Observation table construction unit
104 Behavior execution unit
105 Clustering unit
106 Equivalence testing unit
107 RPW construction unit
108 Observation data DB

The invention claimed is:

1. A fault recovery support apparatus comprising:
a memory; and
a processor configured to execute:
inserting, by a fault inserter, a plurality of faults into a target system;
executing, by a behavior executer, a behavior related to recovery from each of the plurality of the faults for the target system;
constructing, by a first constructor, a plurality of automatons, each representing a recovery process from each of the plurality of the faults, by clustering observation data acquired from the target system as a result of the behavior by the behavior executer; and
constructing, by a second constructor, a workflow representing a behavior for separating each fault included in a plurality of faults and a recovery process of each fault by using a plurality of the automatons related to the plurality of faults,
wherein the constructing by the first constructor includes
clustering the observation data to allocate discrete numbers to a third behavior sequence formed by combining a first behavior sequence for the target system before the observation data is obtained and a second behavior sequence for the target system when the observation data is obtained, and
constructing an automaton based on an observation table in which values of elements having the first behavior sequence as a row index and the second behavior sequence as a column index are set as the discrete numbers by an L* algorithm,
wherein the constructing by the second constructor includes constructing the workflow in which a type of fault and a state that is able to be a state of the target system are indicated by observation data acquired when a behavior is executed on the target system in a form of a directed graph by using a plurality of the automatons of which initial states are not distinguishable,
wherein the workflow is a directed graph comprising a plurality of nodes and a plurality of directed edges,
wherein each node is defined as a tuple of a label of the observation data and a vector indicating current states of the plurality of automatons corresponding to the plurality of faults;
wherein each directed edge from a first node to a second node represents a behavior executable on the target system and the label of the observation data obtained as a result of executing the behavior based on a current state,
wherein the executing, by the behavior executer, includes transmitting, to the target system, a command corresponding to the behavior represented by the each directed edge in the workflow, and acquire observation data from the target system in response to the command execution,
wherein the executing, by the behavior executer, includes:
assigning the label of the observation data to the observation data using a result of the clustering,
determining a transition to a next node in the workflow based on the assigned label of the observation data, and updating the vector indicating the current states of the plurality of automatons corresponding to the plurality of faults, and
executing, based on the determined transition and the updated vector, a recovery control for the target system so as to recover the target system from a fault state toward a normal state.

2. The fault recovery support apparatus according to claim 1, wherein
the constructing by the first constructor includes
giving the discrete number to the third behavior sequence by a classifier that has been learned in advance.

3. A fault recovery support method of causing a computer to perform:
inserting a plurality of faults into a target system;
executing a behavior related to recovery from each of the plurality of the faults for the target system;
constructing a plurality of automatons, each representing a recovery process from each of the plurality of the faults, by clustering observation data acquired from the target system as a result of the behavior in the behavior executer; and
constructing a workflow representing a behavior for separating each fault included in a plurality of faults and a recovery process of each fault by using a plurality of the automatons related to the plurality of faults,
wherein the constructing the plurality of automatons includes
clustering the observation data to allocate discrete numbers to a third behavior sequence formed by combining a first behavior sequence for the target system before the observation data is obtained and a second behavior sequence for the target system when the observation data is obtained, and constructing an automaton based on an observation table in which values of elements having the first behavior sequence as a row index and the second behavior sequence as a column index are set as the discrete numbers by an L* algorithm, wherein the constructing the workflow includes constructing the workflow in which a type of fault and a state that is able to be a state of the target system are indicated by observation data acquired when a behavior is executed on the target system in a form of a directed graph by using a plurality of the automatons of which initial states are not distinguishable, wherein the workflow is a directed graph comprising a plurality of nodes and a plurality of directed edges, wherein each node is defined as a tuple of a label of the observation data and a vector indicating current states of the plurality of automatons corresponding to the plurality of faults;

wherein each directed edge from a first node to a second node represents a behavior executable on the target system and an observation label obtained as a result of executing the behavior based on a current state, and wherein the executing includes transmitting, to the target system, a command corresponding to the behavior represented by the each directed edge in the workflow, and acquiring observation data from the target system in response to the command execution, wherein the executing, by the behavior executer, includes:

assigning the label of the observation data to the observation data using a result of the clustering, determining a transition to a next node in the workflow based on the assigned label of the observation data, and updating the vector indicating the current states of the plurality of automatons corresponding to the plurality of faults, and executing, based on the determined transition and the updated vector, a recovery control for the target system so as to recover the target system from a fault state toward a normal state.

4. A non-transitory computer-readable recording medium having computer-readable instructions stored thereon, which when executed, cause a computer to function as the fault recovery support apparatus according to claim 1.

* * * * *